United States Patent [19]

Handlogten

[11] Patent Number: 5,708,837
[45] Date of Patent: Jan. 13, 1998

[54] METHOD AND APPARATUS FOR REGISTER RENAMING IN A COMPUTER SYSTEM USING A SEPARATE ARITHMETIC AVAILABLE QUEUE

[75] Inventor: Glen H. Handlogten, Rochester, Minn.

[73] Assignee: International Business Machines Corporation, Armonk, N.Y.

[21] Appl. No.: 497,720

[22] Filed: Jun. 30, 1995

[51] Int. Cl.[6] .................................................. G06F 9/00
[52] U.S. Cl. ............................................ 395/800; 395/393
[58] Field of Search .................................... 395/393, 563, 395/874, 876, 800

[56] References Cited

U.S. PATENT DOCUMENTS

| | | |
|---|---|---|
| 4,574,349 | 3/1986 | Rechtschaffen . |
| 4,736,288 | 4/1988 | Shintani et al. ...................... 395/375 |
| 4,752,873 | 6/1988 | Shonai et al. . |
| 4,992,938 | 2/1991 | Cocke et al. ........................ 395/375 |
| 5,134,561 | 7/1992 | Liptay . |
| 5,355,457 | 10/1994 | Shebanow et al. .................. 395/375 |
| 5,452,426 | 9/1995 | Papworth et al. ................... 395/375 |
| 5,517,441 | 5/1996 | Dietz et al. ......................... 365/49 |
| 5,519,841 | 5/1996 | Sager et al. ........................ 395/412 |
| 5,548,738 | 8/1996 | Song .................................. 395/375 |

OTHER PUBLICATIONS

IBM Technical Disclosure Bulletin, vol. 36 No. 11 Nov. 1993, "Load Pointer Queue".
IBM Technical Disclosure Bulletin, vol. 37, No. 1, Jan. 1994, "Unified Fixed and Floating Point Stores".
IBM Technical Disclosure Bulletin, vol. 37, No. 02A, Feb., 1994, "Control Error Checker".

IBM Technical Disclosure Bulletin, vol. 36, No. 04, Apr., 1993, "Multisequencing a Single Instruction Stream Register Renaming and the Size of the Common Virtual Register File".

IBM Journal Of Research And Development, vol. 38, No. 5, Sep. 1994, "Power2 floating-point unit: Architecture and implementation", Hicks et al.

IBM Journal Of Research And Development, vol. 34, No. 1, Jan. 1990, "Machine organization of the IBM RISC System/6000 processor", Grohoski.

*Primary Examiner*—William M. Treat
*Assistant Examiner*—Zarni Maung
*Attorney, Agent, or Firm*—Joan Pennington

[57] ABSTRACT

A method and apparatus for register renaming in a computer system are provided. A map table stores physical register addresses corresponding to architected register addresses. An aritmetic available queue stores addresses of physical register available for aritmetic. A load available queue stores addresses of physical register available for loads. A store queue stores a plurality of pending physical store addresses. An aritmetic store compare function compares a displaced physical register address with the plurality of store addresses for updating the aritmetic available queue. A load store compare function compares a freed physical register address with the plurality of store addresses for updating the load available queue. An instruction queue stores a plurality of pending source and target instruction addresses. A store queue compare function compares one of the plurality of pending store addresses with the target instruction addresses in the instruction queue for updating the load available queue and the aritmetic available queue.

10 Claims, 8 Drawing Sheets

METHOD AND APPARATUS FOR REGISTER RENAMING IN A COMPUTER SYSTEM USING A SEPARATE ARITHMETIC AVAILABLE QUEUE

FIELD OF THE INVENTION

The present invention relates to computer systems, and more particularly to a method and apparatus for register renaming in a computer system.

DESCRIPTION OF THE PRIOR ART

In a high performance computer system, pipelining is used to improve performance by increasing instruction throughput. A pipeline is a serial arrangement of stages separated by registers which are a type of latch that are associated with a functional unit in a processor. Examples of functional units in a processor are a floating point unit, a fixed point unit, an instruction unit and a memory management unit. Each of these units may be pipelined and may have its own set of registers and latches. The processor executes assembly instructions by breaking those instructions up into component parts and executing each component part individually. As component parts are executed by the processor logic, each component part will have a result called an intermediate result to distinguish it from the result of the instruction as a whole, which is passed to the next stage of logic in the processor via the latches in the pipeline. A pipelined processor has the capability to execute multiple instructions at once, each instruction being broken down into component parts and each being at a different stage of execution in the pipelines of the functional units.

A stall occurs when a subsequent instruction is dependent on the result of a previous instruction that is still in the pipeline and has not yet completed execution. Stalls degrade performance. Many stalls are required by the hardware's deficiencies, but are not required for correct program execution.

One way to attack stalls is to reduce their side effects. To work efficiently, functional units need to operate independently. For example, one functional unit's stalling should not cause other functional units to stall. If the functional units can queue instructions, an individual unit can stall without affecting performance. For example, an instruction unit (I-unit) can ignore stalls and continue to issue instructions. However, the process of queuing issued instructions is very difficult due to data dependencies that must go backwards in time or pipeline data hazards, reuse, and the like.

In addition to data hazards, control or branch hazards cause delay in determining the proper instruction to fetch. An unresolved branch occurs when the processor cannot determine the target of a branch instruction because it is dependent on a previous instruction that has not yet completed. Thus, the processor cannot determine which instruction to execute next. Speculative execution occurs when the processor guesses which instruction to execute next. The guess may be incorrect, in which case it must appear to the outside world that the instructions issued after the branch were never executed. Unresolved branches often lead to stalls. Even with speculative execution, operations cannot write to the registers until the branch is resolved. Operations must stop in the last stage capable of stalling which is usually the top of the dataflow, or some form of completion buffer must be used to hold these results until the branch is resolved.

Renaming on loads and a completion buffer scheme has used with the IBM RS/6000. However, it is complicated arrangement and store instructions cannot be handled efficiently. Stores remain queued until all arithmetic issued ahead of them has entered the dataflow because actual dependencies cannot be checked. This means when a Load-Arithmetic-Store loop is unrolled and optimized (technique referred to as software pipelining), the first store must wait for the last arithmetic. As a result, no advantage is seen from the compilers attempt to speed execution by moving stores away from the arithmetic that produces their results. Another disadvantage is that the store data must be queued, not just the store instruction.

U.S. Pat. No. 4,992,938, issued Feb. 12, 1991 to Cocke et al. and assigned to the assignee of the present application, discloses an instruction control mechanism for a computer system. The '938 patent discloses a register renaming scheme that permits parallelism among floating point operations. The subject matter of the above identified U.S. Pat. No. 4,992,938 is incorporated herein by reference.

While the '938 patent provides improvement of other prior art arrangements, a need remains for improved instruction control processing that minimizes performance degradation from stalls.

SUMMARY OF THE INVENTION

A principal object of the present invention is to provide an improved method and apparatus for register renaming in a computer system. Other objects of the present invention are to provide an improved register renaming apparatus and to provide a register renaming apparatus that overcomes many of the disadvantages of prior art arrangements.

In brief, a method and apparatus for register renaming in a computer system are provided. A map table stores physical register addresses corresponding to architected register addresses. An aritmetic available queue stores addresses of physical register available for aritmetic. A load available queue stores addresses of physical register available for loads. A store queue stores a plurality of pending physical store addresses. An aritmetic store compare function compares a displaced physical register address with the plurality of store addresses for updating the aritmetic available queue. A load store compare function compares a freed physical register address with the plurality of store addresses for updating the load available queue. An instruction queue stores a plurality of pending source and target instruction addresses. A store queue compare function compares one of the plurality of pending store addresses with the target instruction addresses in the instruction queue for updating the load available queue and the aritmetic available queue.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
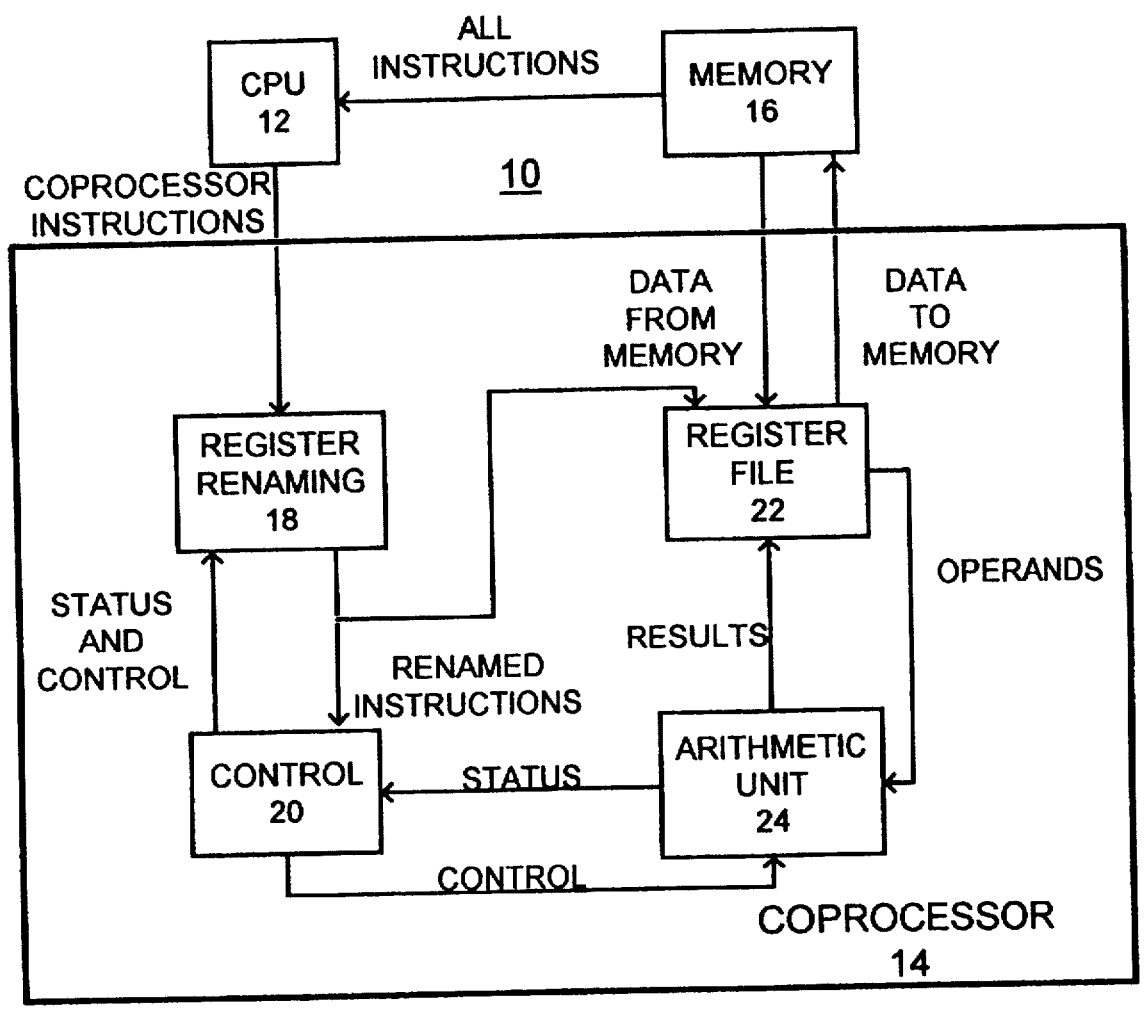
FIG. 1 is a logical and block diagram representation of a computer system in accordance with the present invention.

Having reference now to the drawings, in FIG. 1 there is shown a computer system in accordance with the invention generally designated by 10. Computer system 10 includes a central processing unit (CPU) 12, a coprocessor 14 receiving coprocessor instructions from the CPU 12 and a memory 16 providing all instructions to the CPU 12 and receiving and providing data to the coprocessor 14. Coprocessor 14 includes a register renaming stage 18 coupled to the CPU 12, a control 20 and a register file 22 and an arithmetic unit 24 coupled to the control 20 and the register file 22.

The register renaming stage 18 of the invention changes, remaps and renames the registers assigned by the compiler in order to allow speculative execution after an unresolved branch; allow instructions from the instruction unit to be queued by the floating point (FP) functional unit in a manner that reduces subsequent stalls; and allow instructions to be executed out of order.

Figure 2:
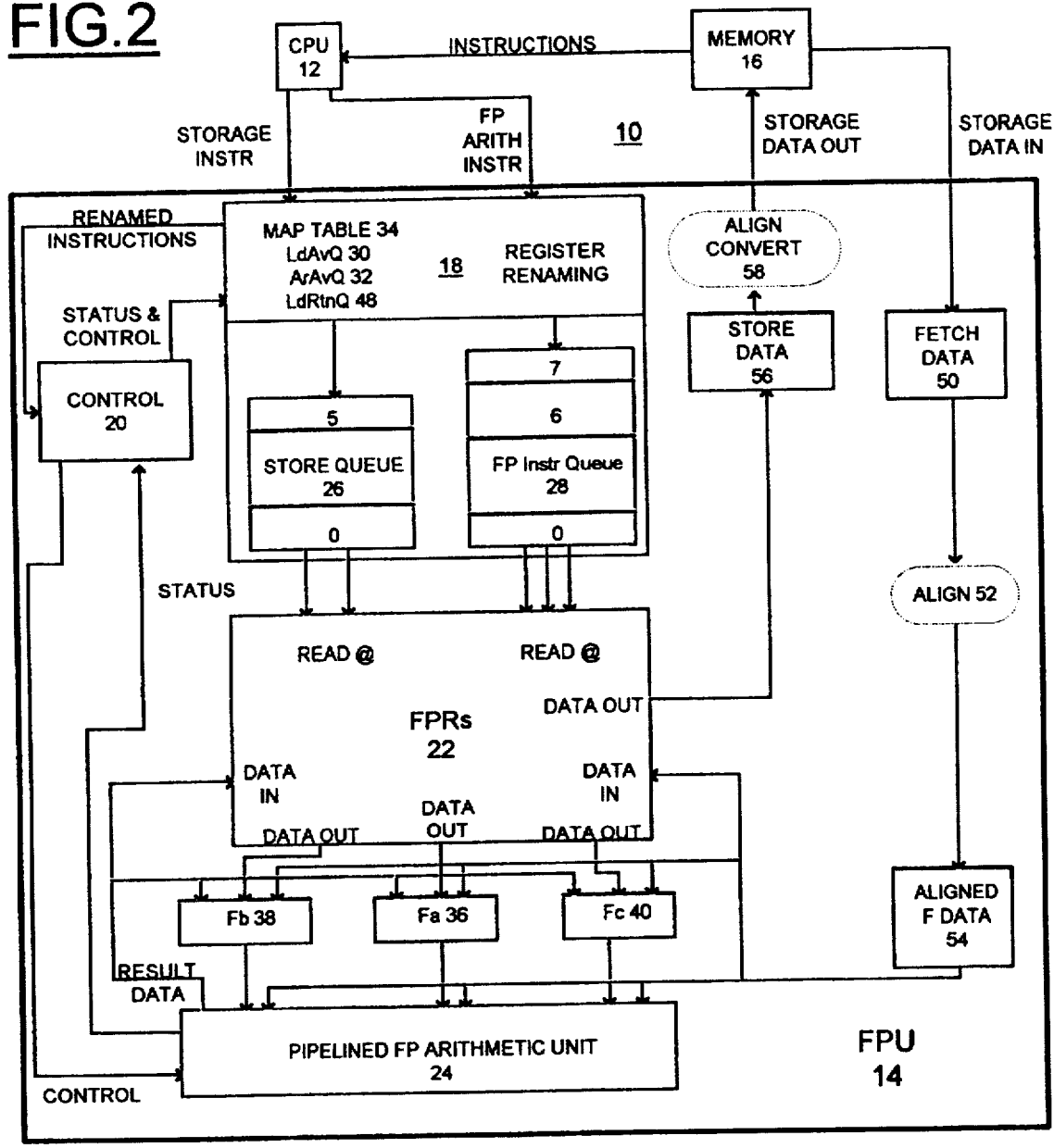
FIG. 2 is a more detailed logical and block diagram representation of the computer system of FIG. 1 in accordance with the present invention.

Referring also to FIG. 2, the register renaming stage 18 receives the coprocessor instructions including storage instructions and FP arithmetic instructions from the CPU 12. Register renaming stage 18 applies renamed instructions to register file or floating point registers (FPRs) 22 via a store queue 26 and a FP instruction queue 28. Register renaming stage 18 includes a load available queue (LdAvQ) 30, an arithmetic available queue (ArAvQ) 32 and a map table 34. The separate load and arithmetic available queues 30 and 32 enable more efficient operation as compared to the single free list 1000 of the '938 patent. The extra physical registers are kept in one of the two available queues 30 and 32. The addresses of the physical registers 22 move through the rename logic on several connected loops, illustrated and described with respect to FIGS. 3 and 4.

The current association between physical registers and architected registers is kept in the map table 34. The renaming or reading of the map table 34 and remapping or changing of the map table is done as the instructions are dispatched to the units. Loads and arithmetic cause a remapping of the register that will be written with the result data. All physical addresses must exist in one and only one location within these loops. When an address leaves an available queue 30 or 32, it will eventually travel through one of these loops and return to an available queue 30 or 32. These loops are gated by events that guarantee no address will be allowed on an available queue until all dependencies on the old data have been satisfied. The addresses are not limited to either type of remapping. An addresses that originated in the load available queue LdAvQ 30 may later be found on the arithmetic available queue ArAvQ 32.

Data out of the FPRs 22, storage data in and results data from the pipelined FP aritmetic unit 24 are applied to register latches Fa 36, Fb 38, and Fc 40 that are coupled between the FPRs 22 and the pipelined Fp aritmetic unit 24. Storage data in from memory 16 is applied to the pipelined FP arithmetic unit 24, FPRs 22 and the Fa, Fb and Fc latches 36, 38 and 40 via a fetch data latch 50, a combinational logic align 52 and an aligned Fetch data latch 54. Data out from the FPRs 22 is coupled to the memory 16 via a store data latch 56 and a combinational logic align convert 58.

The present invention provides a simple mechanism to allow all operations that write a register to write unused registers as their final destinations. Both loads and arithmetic cause a remapping or a new association of architected register to physical register that lasts until another operation writes that same architected register. When a remapping occurs, the old address is not made available for other operations until all dependent instructions have read the old value.

Normally, putting data into a register overwrites the data that it last held. By assigning an unused register for every write, multiple results may be associated with a single architected register 22. Once this is done, data hazards including Write-After-Read and Write-After-Write cause no stalls and take no effort because they do not overwrite the data. Read-After-Write is also simplified because the dependency is made very clear. Without this form of renaming of the invention, multiple and queued loads and arithmetic to the same register make subsequent reads of that register by arithmetic and/or stores difficult to resolve, assuming some method has been devised to handle the multiple writes to the same register in the first place. In many cases it is impossible, since when the reading operation begins for example, by a queued store, the data has already been overwritten.

Figure 3:
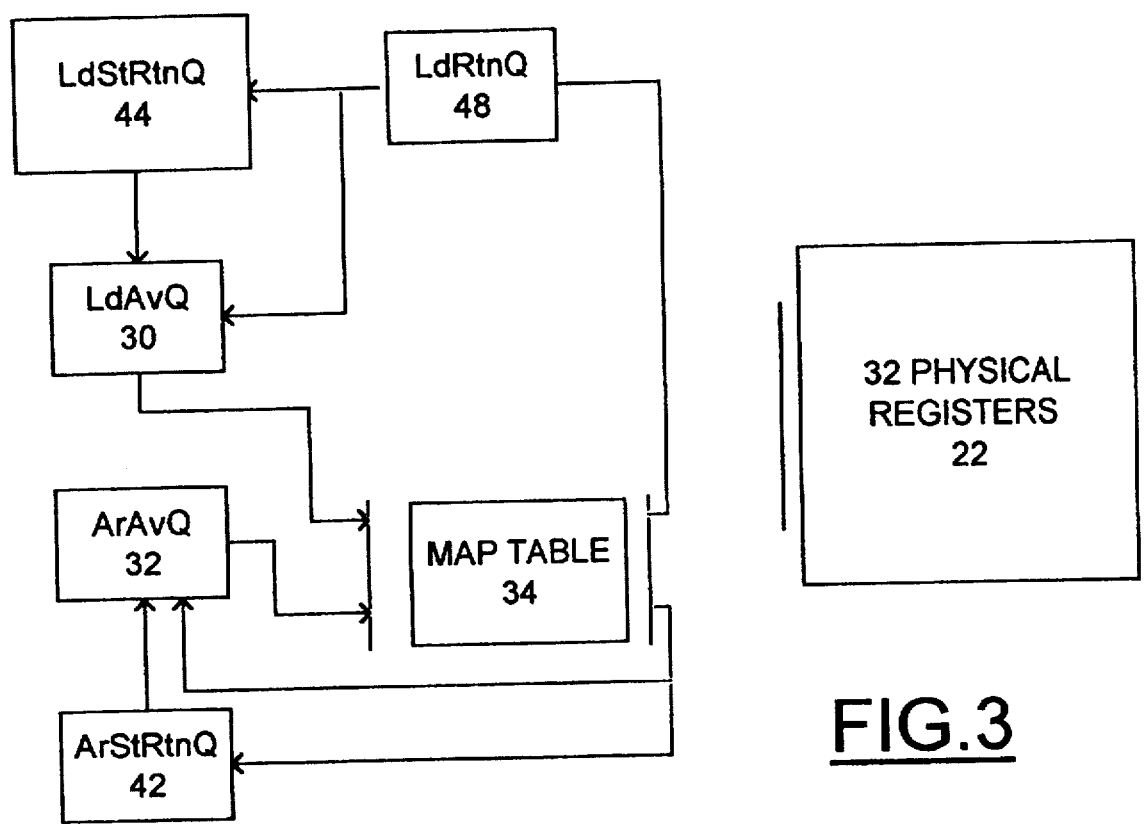
FIG. 3 is a block diagram representation illustrating a register renaming stage of the system of FIG. 1 according to the present invention.
Figure 4:
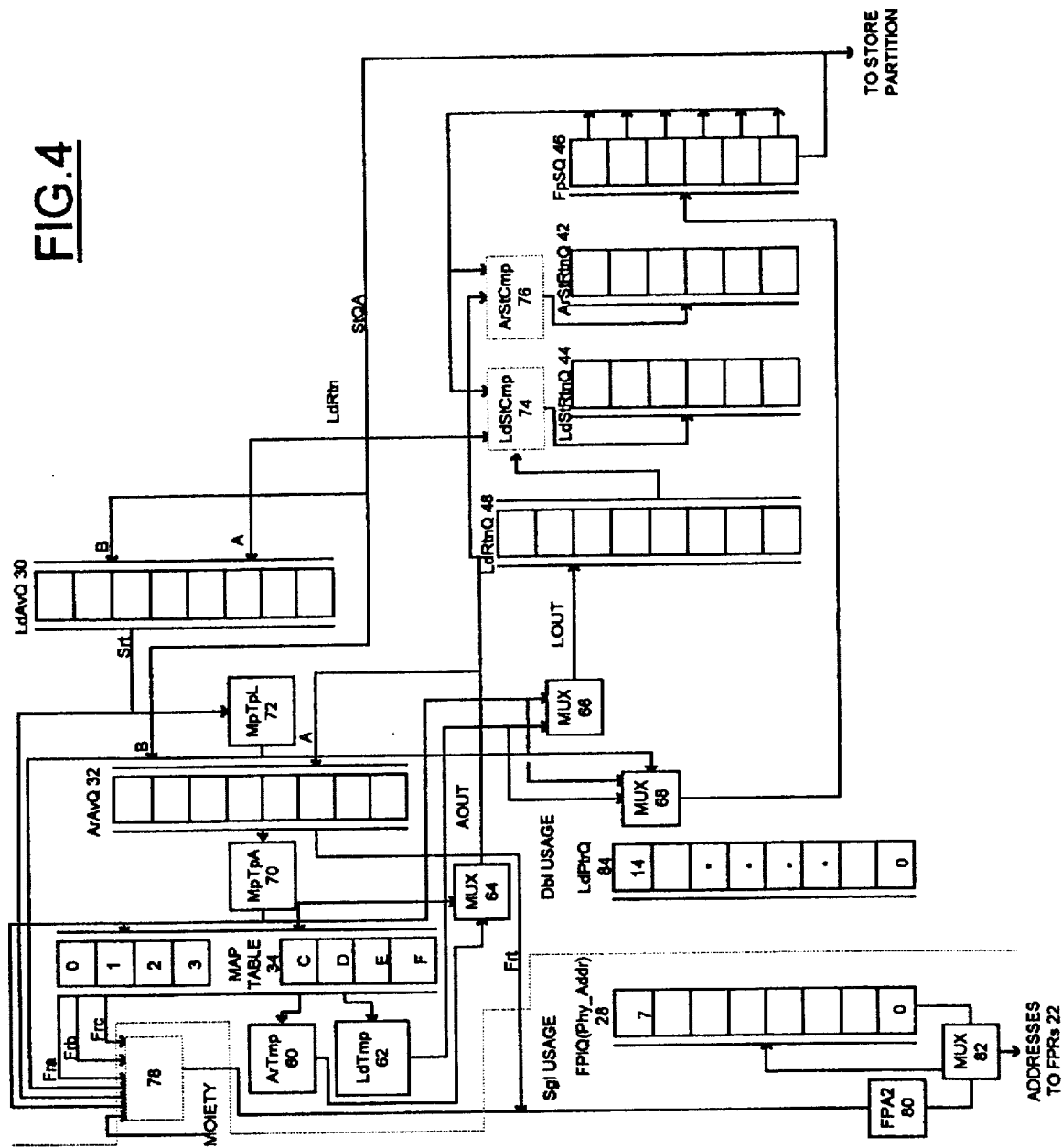
FIG. 4 is a more detailed logical dataflow and block diagram representation of the register renaming stage according to the present invention.

Referring also to FIGS. 3 and 4, store queue 26 includes an arithmetic store return queue (ArStRtnQ) 42, a load store return queue (LdStRtnQ) 44 and a FP store queue (FpSQ) 46. FpSQ 46 is shown in FIG. 4. A load return queue (LdRtnQ) 48 coupled to the map table 34 provides a pending target return queue in the load path. All load addresses removed from the map table 34 are provided to the LdRtnQ 48. When an address is freed from the LdRtnQ 48, the freed address is compared with the addresses in the FP store queue 46 and is placed on the LdAvQ 30 if no match is found. Otherwise, when the freed LdRtnQ load address matches any address in the FP store queue 46, it is placed on the LdStRtnQ 44 at the point of the newest matching address.

Register renaming stage 18 treats the remapping of arithmetic and the remapping of loads differently. An arithmetic address removed from the map table 34 goes directly to the ArAvQ 32 if it does not match any address on the FP store queue 46. Otherwise, an arithmetic address removed from the map table 34 that matches an address on the FP store queue 46 goes to the ArStRtnQ 42 and returns to the ArAvQ 32 when the store is processed. By doing this, half of the addresses, the arithmetic addresses, can be returned to an available queue 30 or 32 much quicker. The '938 patent makes no distinction between arithmetic and loads. The remapping of arithmetic is important feature of the invention because when a functional unit runs out of available addresses it must stall the I-unit that issues the instructions to the other units.

An even and odd copy of 32 physical register 22 provide 64 physical registers that are used to represent 32 architected registers. Similarly an odd and even copy is provided of the map table 34, LdAvQ 30, ArAvQ 32, LdRtnQ 48, ArStRtnQ 42, and LdStRtnQ 44. There are enough excess registers and they are recycled fast enough that the renaming itself will rarely cause a stall. When it does, other parts of the hardware will also need to stall, for example the store queue 26 would also likely be full.

FIG. 4 illustrates the register renaming high level dataflow. The logic that makes registers available for reuse is flexible. At a minimum, it must guarantee that no subsequent instruction will need the data held by the register. Aritmetic and load addresses from the map table 34 are applied to an aritmetic latch (ArTmp) 60 and a load LdTmp 62 for temporary holding for timing purposes and are provided to multiplexers 64, 66, and 68. A map table Arithmetic (MpTpA) latch 70 is coupled between the ArAvQ 32 and the map table 34. A map table load (MpTpL) latch 72 is coupled to the LdAvQ 30 and the map table 34. The latched address output of MpTpA 70 is provided to multiplexer 66 and to a multiplexer logic function 78 that couples addresses for the FPRs 22 and the FPIQ 28. The latched address output of MpTpL 72 is provided to multiplexer 68 and to the multiplexer logic function 78 for the FPRs 22. The displaced load address output of multiplexer 66 on line Lout is provided to the LdRtnQ 48 that is coupled to a load store compare (LdStCmp) 74. The output of multiplexer 68 is provided to the FpSQ 46. Multiplexer logic function 78 selects from its inputs from the MpTpA 70, the MpTpL 72, the LdAvQ 30 and the Fra, Frb, Frc from the map table 34 and provides a, b, and c source address outputs. A moiety input to multiplexer logic function 78 is used to provide odd addresses for the FPRs 22 and the FPIQ 28. A physical floating point pipeline address 2 (PFA2) latch 80 provided to balance out timing delay is coupled to a multiplexer 82 with the physical address in FPIQ 28 providing addresses to the FPRs 22.

The load store compare (LdStCmp) 74 compares the freed load address of the LdRtnQ 48 with addresses in the FP store queue 46 to see if any stores are waiting for this data. If there are none, the address is made available to the LctAvQ 30 at line labelled LdRtn. If there are dependent stores, the address is returned to the LdAvQ 30 after the last dependent store has read the register. When a matching address or matching addresses are found by the LdStCmp 74, a bit is set for the newest matching address in the LdStRtnQ 44.

The displaced address output of mux 64 on line Aout is provided to the ArAvQ 32 and an arithmetic store compare (ArStCmp) 76. The arithmetic store compare (ArStCmp) 76 compares the returned address caused by writing arithmetic at line AOUT with addresses in the FP store queue 46 to see if any stores are waiting for this data. If there are none, the address is made available by the direct path from the map table 34 to the ArAvQ 32. If there are dependent stores, the address is returned to the ArAvQ 32 after the last dependent store has read the register. When a matching address or matching addresses are found by the ArStCmp 76, a bit is set for the newest matching address in the ArStRtnQ 42.

Figure 5:
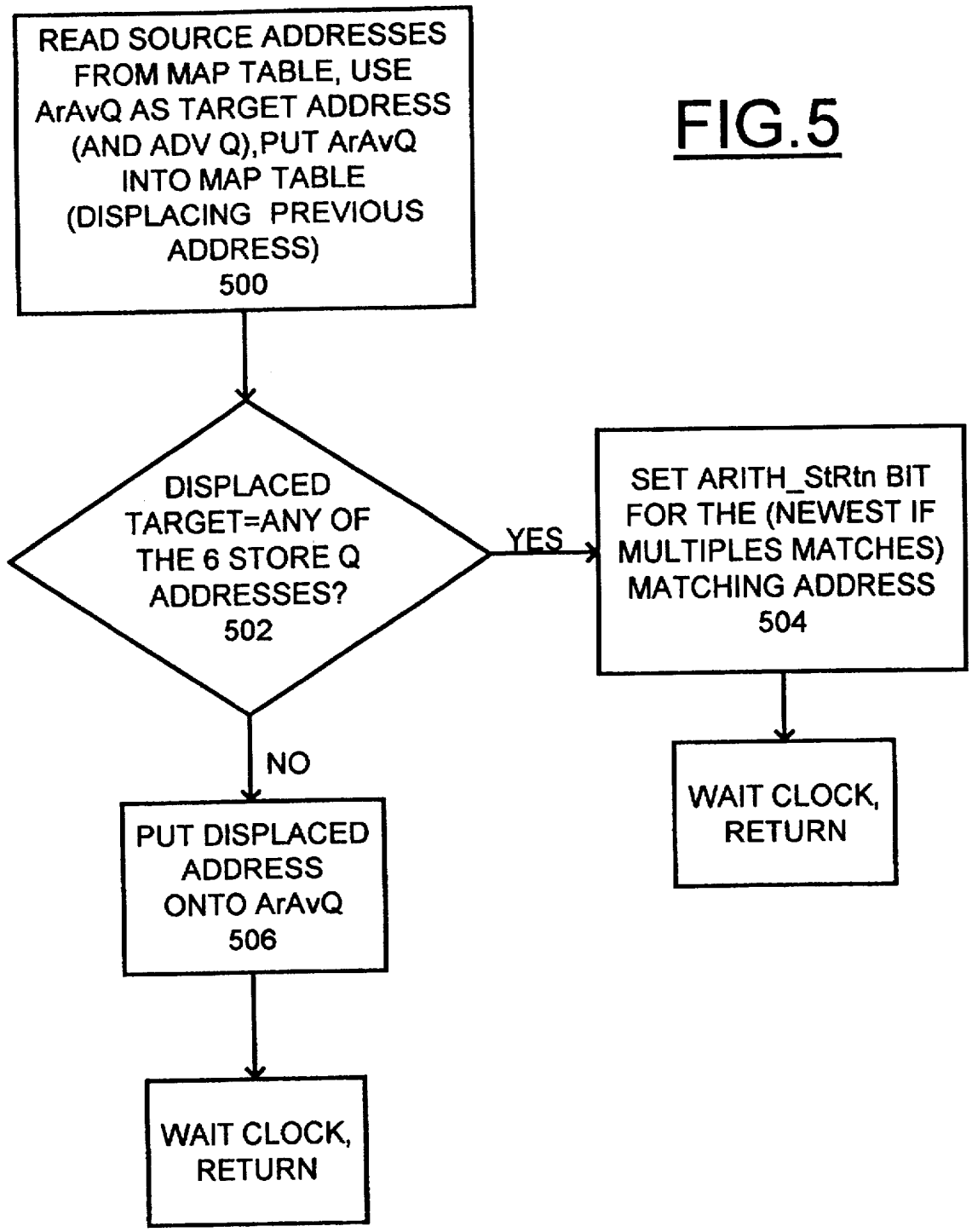
FIGS. 5, 6A, 6B, and 7 are flow diagram illustrating parallel arithmetic, load and store operation processing in the system of FIG. 1 in accordance with the present invention.

Having reference to FIGS. 5, 6A, 6B and 7, there are shown flow diagram illustrating parallel arithmetic, load and store operation processing in the system of FIG. 1 in accordance with the present invention. Arithmetic operation processing is illustrated in FIG. 5 that begin with reading source addresses from the map table 34, using the ArAvQ 32 as a target address and advancing the ArAvQ 32, and putting the ArAvQ address into the map table as indicated at a block 500. Then the displaced target address is compared with up to six addresses stored in the FpSQ 46 as indicated at a block 502. If a matching address is found, the bit is set for the newest matching address in the ArStRtn 42 as indicated at a block 504. Otherwise if a matching address is not found, the displaced target address is put onto the ArAvQ 32 as indicated at a block 506. Then after the bit is set at block 504 or the displaced target address is put onto the ArAvQ 32 and after waiting a cycle, the aritmetic operation processing return to block 500 as indicated at a block labelled WAIT CLOCK, RETURN.

Figure 6A:
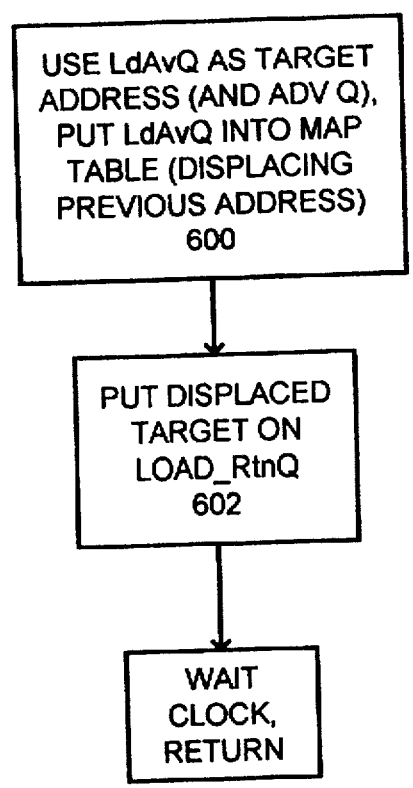
Figure 6B:
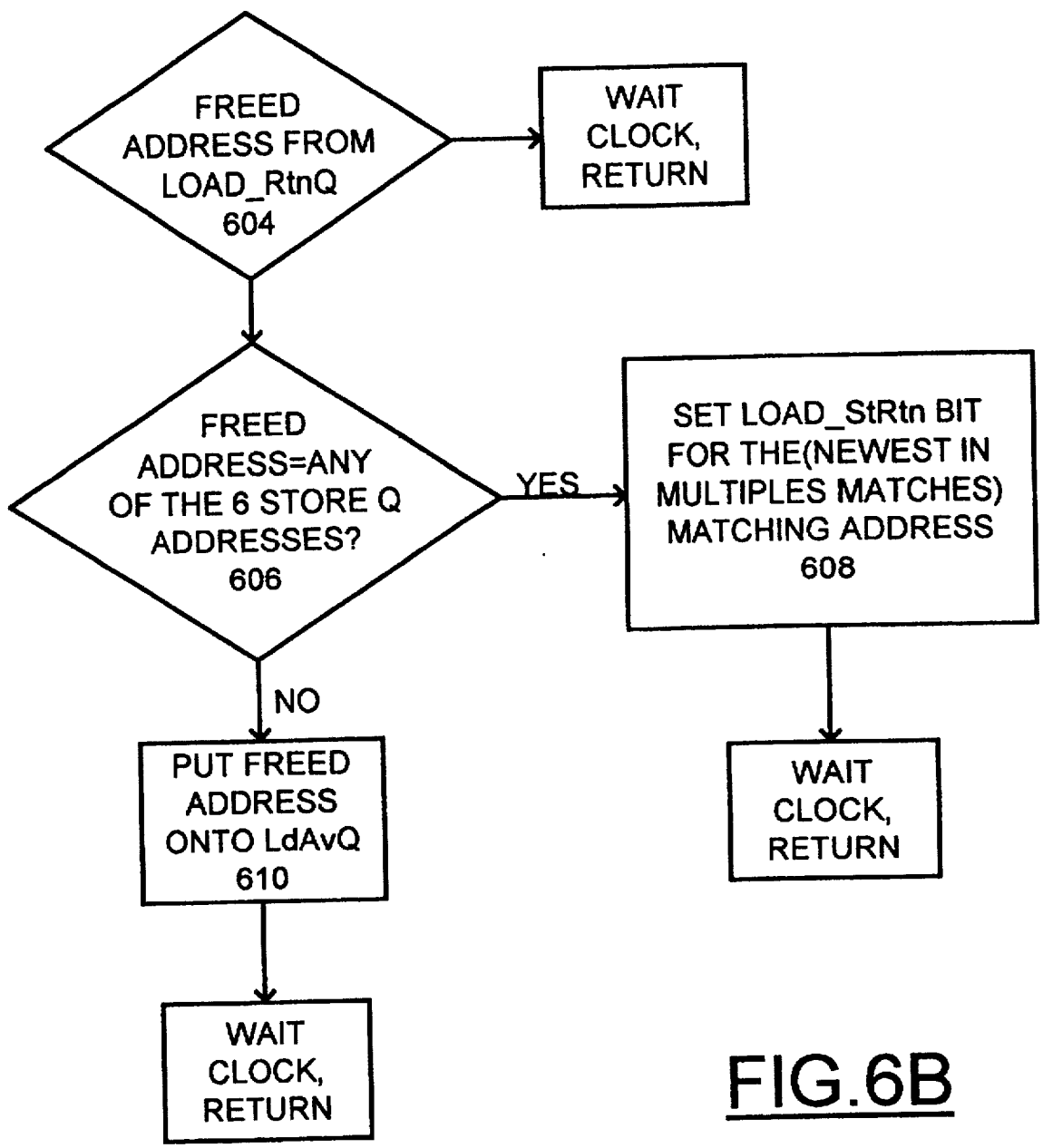

Parallel load operation processing is illustrated in FIGS. 6A and 6B where the LdAvQ 30 is used as the target address and the LdAvQ 30 is advanced and the LdAvQ address is put into the map table as indicated at a block 600. The displaced target address is put onto the LdRtnQ 48 as indicated a block 602. After waiting a cycle, the load operation processing return to block 600 as indicated at a block labelled WAIT CLOCK, RETURN. In FIG. 6B, a parallel load operation sequence begins with determining whether an address is freed from the LdRtnQ as indicated at a decision block 604. If not, the load operation processing return to block 604 after waiting a cycle as indicated at a block labelled WAIT CLOCK, RETURN. If an address is freed from the LdRtnQ 48, then the freed address is compared with the six addresses stored in the FpSQ 46 as indicated at a block 606. If a matching address is found, the bit is set for the newest matching address in the LdStRtn 44 as indicated at a block 608. Otherwise if a matching address is not found, the freed address is put onto the LdAvQ 30 as indicated at a block 610. Then the load operation processing return to block 604 after waiting a cycle as indicated at the blocks labelled WAIT CLOCK, RETURN.

Figure 7:
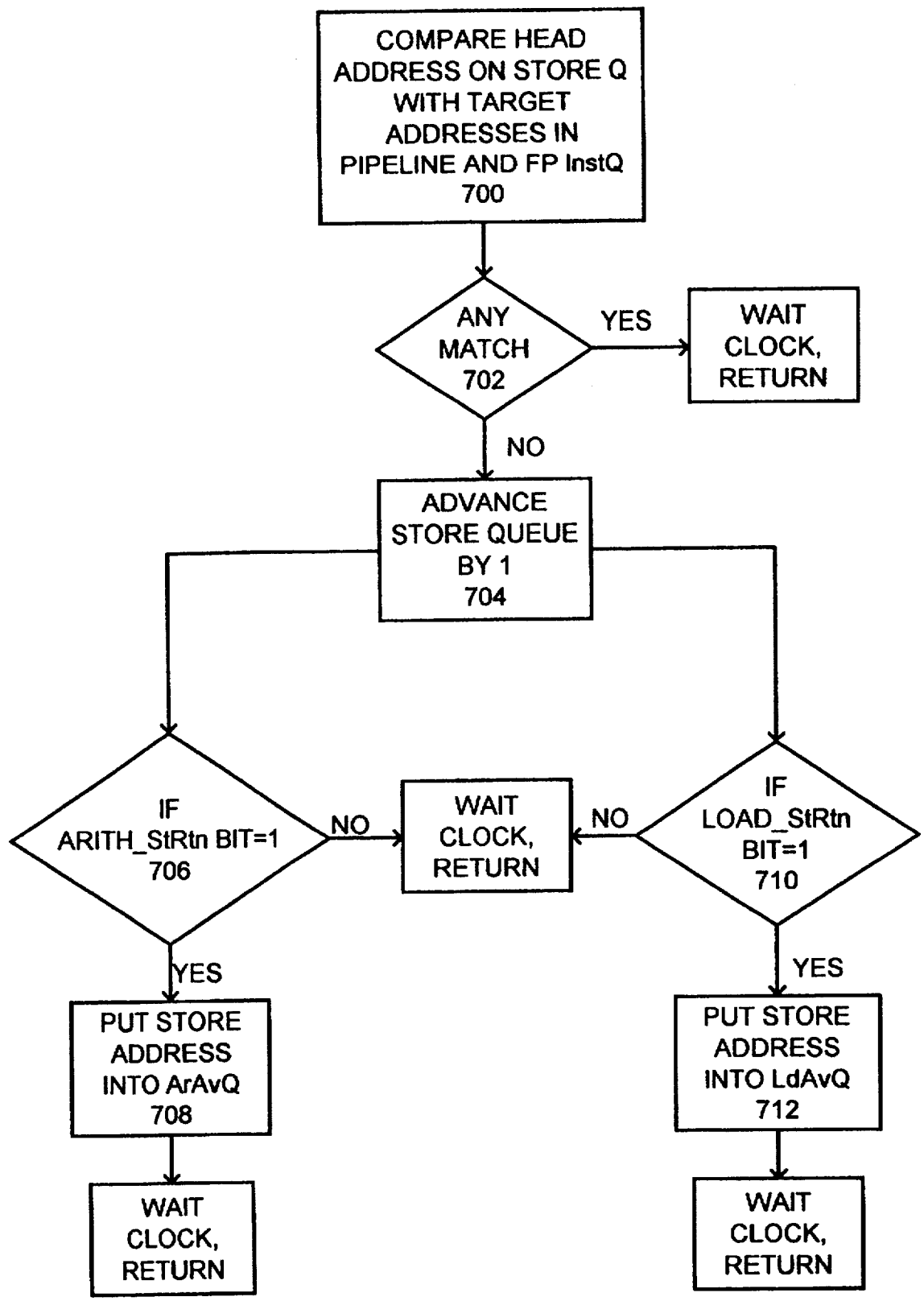

Another feature of the invention is that stores are processed more efficiently as compared to the '938 patent which uses store counting. Store counting causes each store to stall until all arithmetic issued prior to the store, has completed. This adds some stalls that are not necessary with the present invention. Most compilers separate dependencies by moving dependent instructions away from each other to avoid stalls as shown in the following example. Store counting removes some of the benefit of doing this. As shown in FIG. 7, stores are processed out as soon as the result is available. Aside from completing some stores sooner this also has other effects. Stores are held on the store queue 26 of limited depth, for example, of 6. When a store is stalled, the I-unit may continue issuing instructions as long as the queuing facilities have room. This means that these extra stalls not only delay the stores themselves, they may also cause the I-unit to stall if the store queue fills. Stalling stores also delays the return of addresses to the available queue. If the available queue becomes empty, the I-unit must again stall.

Parallel store operation processing is illustrated in FIG. 7 that begin with comparing the head address on the store Q 26 with the target addresses in the pipeline and the FP instr queue 28 as indicated at a block 700. If a match is found at a decision block 702, then the store operation processing returns to block 700 after waiting a cycle as indicated at a block labelled WAIT CLOCK, RETURN. Otherwise when a match is not found at block 702, then the store queue LdStRtnQ 44 and ArStRtnQ 42 are advanced by 1 as indicated at a block 704. If the ArStRtn bit is equal to one at a decision block 708, the address is put on the ArAvQ 32 as indicated at a block 708. Then and when determined at block 706 the ArStRtn bit is not equal to one, the store operation processing returns to block 700 after waiting a cycle as indicated at a block labelled WAIT CLOCK, RETURN. At the same time the LdStRtn bit is compared with one as indicated at a decision block 710. If equal to one, the address is put on the LdAvQ 30 as indicated at a block 712. Then and when determined at block 710 the LdStRtn bit is not equal to one, the store operation processing returns to block 700 after waiting a cycle as indicated at a block labelled WAIT CLOCK, RETURN.

Consider the following example, since a compiler knows the add (2) takes a few cycles, instruction 2 and 3 are separated by the compiler to help the hardware avoid stalling.

| 1. sub 0 ← 1 − 2 | | 2. add 3 ← 4 + 5 |
|---|---|---|
| 2. add 3 ← 4 + 5 | compiler | 1. sub 0 ← 1 − 2 |
| 3. store 3 | reorders to → | 4. mult 6 ← 7 * 8 |
| 4. mult 6 ← 7 * 8 | | 5. sub 9 ← 10 − 11 |
| 5. sub 9 ← 10 − 11 | | 3. store 3 |
| 6. mult 11 < | | 6. mult 11 |

With the reordered code, the operation disclosed by the '938 patent will not start instruction 3 until instruction 5 is started. The present invention allows instruction 3 to start as soon as instruction 2's result is available. In other words, stores are processed out of order with respect to arithmetic.

Another case worth considering is where the store instruction has no dependency (the dependency is far away). U.S. Pat. No. 4,992,938 will still stall the store until all previous (and unrelated) arithmetic has started.

The following example shows the important feature of the invention to quickly move physical registers from the Map table 34 back to the ArAvQ 32 as possible. It also shows how it is possible to move them directly from the Map table 34 to the ArAvQ.

Even if only 1 physical register is available (number 19 when we start) and the Floating Point pipeline is stalled (no instructions can enter), the processor can continue to issue instructions to the FPU. For example, consider the following instruction stream (add registers 3, 4, 5, 6 and 7 together):

1. Fadd 3 <−3,4
2. Fadd 3 <−3,5
3. Fadd 3 <−3,6
4. Fadd 3 <−3,7

A starting state is illustrated in Table 1.

TABLE 1

| Arith Av Q | Map table 34 | |
|---|---|---|
| — | 00 | 13 |
| — | 01 | 10 |
| — | 02 | 06 |
| — | 03 | 08 |
| — | 04 | 16 |
| — | 05 | 28 |
| — | 06 | 22 |
| 19 | 07 | 01 |
| | 08 | 30 |
| | 09 | 07 |
| | 10 | 03 |
| | 11 | 00 |
| | 12 | 31 |
| | 13 | 11 |
| | 14 | 05 |
| | 15 | 02 |

In the next cycle, the next instruction is remapped into the physical registers shown in parenthesis and moved onto the FP Inst Queue as follows.

| | FP Inst Queue |
|---|---|
| 1. Fadd 3(19) ← 3(08), 4(16) → | Fadd 19 ← 08, 16 |
| 2. Fadd 3 ← 3, 5 | |
| 3. Fadd 3 ← 3, 6 | |
| 4. Fadd 3 ← 3, 7 | |

The Arith Av Q 32 and map table 34 are updated as shown below in Table 2.

TABLE 2

| Arith Av Q | Map table 34 | |
|---|---|---|
| 08 | 00 | 13 |
| — | 01 | 10 |
| — | 02 | 06 |
| — | 03 | 19 |
| — | 04 | 16 |
| — | 05 | 28 |
| — | 06 | 22 |
| — | 07 | 01 |
| | 08 | 30 |
| | 09 | 07 |
| | 10 | 03 |
| | 11 | 00 |
| | 12 | 31 |
| | 13 | 11 |
| | 14 | 05 |
| | 15 | 02 |

In the next cycle, the next instruction is remapped into the physical registers shown in parenthesis and moved onto the FP Inst Queue

| | FP Inst Queue |
|---|---|
| 2. Fadd 3(08) ← 3(19), 5(25) → | Fadd 08 ← 19, 28 |
| 3. Fadd 3 ← 3, 6 | Fadd 19 ← 08, 16 |
| 4. Fadd 3 ← 3, 7 | |

Then the Arith Av Q and Map table 34 are updated as shown below in Table 3.

TABLE 3

| Arith Av Q | Map table 34 | |
|---|---|---|
| — | 00 | 13 |
| 19 | 01 | 10 |
| — | 02 | 06 |
| — | 03 | 08 |
| — | 04 | 16 |
| — | 05 | 28 |
| — | 06 | 22 |
| — | 07 | 01 |
| | 08 | 30 |
| | 09 | 07 |
| | 10 | 03 |
| | 11 | 00 |
| | 12 | 31 |
| | 13 | 11 |
| | 14 | 05 |
| | 15 | 02 |

In the next cycle, the next instruction is remapped into the physical registers shown in parenthesis and moved onto the FP Inst Queue

| | FP Inst Queue |
|---|---|
| 3. Fadd 3(19) ← 3(08), 6(22) → | Fadd 19 ← 08, 22 |
| 4. Fadd 3 ← 3, 7 | Fadd 08 ← 19, 28 |
| | Fadd 19 ← 08, 16 |

The Arith Av Q and Map table 34 are updated as shown below in Table 4.

TABLE 4

| Arith Av Q | Map table 34 | |
|---|---|---|
| — | 00 | 13 |
| — | 01 | 10 |
| 08 | 02 | 06 |
| — | 03 | 19 |
| — | 04 | 16 |
| — | 05 | 28 |
| — | 06 | 22 |
| — | 07 | 01 |
|  | 08 | 30 |
|  | 09 | 07 |
|  | 10 | 03 |
|  | 11 | 00 |
|  | 12 | 31 |
|  | 13 | 11 |
|  | 14 | 05 |
|  | 15 | 02 |

In the next cycle, the next instruction is remapped into the physical registers shown in parenthesis and moved onto the FP Inst Queue.

| | FP Inst Queue |
|---|---|
| 4. Fadd 3(08) ← 3(19), 7(01) → | Fadd 08 ← 19, 01 |
| | Fadd 19 ← 08, 22 |
| | Fadd 08 ← 19, 28 |
| | Fadd 19 ← 08, 16 |

The final stage of the Arith Av Q and Map table 34 is shown below in Table 5. Since there is still an address in the ArAvQ 32, further processing could continue beyond this example.

TABLE 5

| Arith Av Q | Map table 34 | |
|---|---|---|
| — | 00 | 13 |
| — | 01 | 10 |
| — | 02 | 06 |
| 19 | 03 | 08 |
| — | 04 | 16 |
| — | 05 | 28 |
| — | 06 | 22 |
| — | 07 | 01 |
|  | 08 | 30 |
|  | 09 | 07 |
|  | 10 | 03 |
|  | 11 | 00 |
|  | 12 | 31 |
|  | 13 | 11 |
|  | 14 | 05 |
|  | 15 | 02 |

The instructions on the Fp Inst Queue can be executed in order as shown below and the correct result will be obtained.

FP Inst Queue
Fadd 08 <–19,01
Fadd 19 <–08,22
Fadd 08 <–19,28
Fadd 19 <–08,16

While the present invention has been described with reference to the details of the embodiments of the invention shown in the drawing, these details are not intended to limit the scope of the invention as claimed in the appended claims.

What is claimed is:

1. A register renaming apparatus for a computer system comprising:

a map table for storing physical register addresses corresponding to architected register addresses;

arithmetic available queue for storing addresses of physical register available for arithmetic, said arithmetic available queue connected to a first input of said map table and connected to a first output from said map table;

load available queue for storing addresses of physical register available for loads, said load available queue connected to a second input of said map table;

a store queue for storing a plurality of pending physical store addresses, said store queue including an arithmetic store return queue connected to said first output from said map table and connected to a second input of said arithmetic available queue, and a load store return queue coupled between said map table and said load available queue;

arithmetic store compare means for comparing a displaced physical register address with said plurality of store addresses and updating said arithmetic available queue;

arithmetic store compare means including means for updating said arithmetic store return queue responsive to a matching store address to said displaced address being identified;

load store compare means for comparing a freed physical register address with said plurality of store addresses and updating said load available queue;

instruction queue for storing a plurality of pending 4 source and target instruction addresses; and store queue compare means for comparing one of said plurality of pending store addresses with said target instruction addresses in said instruction queue and for updating said load available queue and said arithmetic available queue.

2. A register renaming apparatus as recited in claim 1 wherein said arithmetic store compare means includes means for directly moving said displaced physical register address from said map table to said arithmetic available queue responsive to no matching store address to said displaced address being identified.

3. A register renaming apparatus as recited in claim 1 further includes a load return queue for storing freed addresses from said map table and wherein said load store compare means includes means for moving said freed physical register address from said load return queue to said load available queue responsive to no matching store address to said freed address being identified.

4. A register renaming apparatus as recited in claim 3 wherein said load store return queue stores freed physical register addresses from said load return queue and wherein said load store compare means includes means for updating said load store return queue responsive to a matching store address to said freed address being identified.

5. A register renaming apparatus as recited in claim 1 wherein said store queue compare means further includes means for updating said store queue.

6. A method for register renaming in a computer system comprising the steps of:

storing physical register addresses corresponding to t architected register addresses in a map table;

storing addresses of physical register available for arithmetic in an arithmetic available queue, said arithmetic available queue connected to a first input of said map table and connected to a first output from said map table;

storing addresses of physical register available for loads in a load available queue, said load available queue connected to a second input of said map table;

storing a plurality of pending physical store addresses in a store queue, said store queue including an arithmetic store return queue connected to said first output from said map table and connected to a second input of said arithmetic available queue, and a load store return queue coupled between said map table and said load available queue;

comparing a displaced physical register address with said plurality of store addresses for updating said arithmetic available queue;

comparing a freed physical register address with said plurality of store addresses for updating said load available queue;

storing a plurality of pending source and target instruction addresses in an instruction queue; and comparing one of said plurality of pending store addresses with said source and target instruction addresses in said instruction queue for updating said load available queue and said arithmetic available queue;

directly moving said displaced physical register address from said map table to said arithmetic available queue responsive to no matching store address to said displaced address being identified; and storing said displaced physical register address from said map table in an arithmetic store return queue responsive to a matching store address to said displaced address being identified.

7. A method as recited in claim 6 wherein the step of comparing a freed physical register address with said plurality of store addresses for updating said load available queue includes the steps of:

storing freed load addresses from said map table in a load return queue; and moving said freed physical register address from said load return queue to said load available queue responsive to no matching store address to said freed address being identified.

8. A method as recited in claim 7 further includes the step of:

storing said freed physical register address in said load store return queue responsive to a matching store address to said freed address being identified.

9. A method as recited in claim 6 further includes the step of:

processing a pending store operation from said store queue responsive to a corresponding data result being available.

10. A method as recited in claim 9 wherein said step of processing said pending store operation includes the step of advancing said store queue by one and placing a removed pending store address on one of said load available queue or said arithmetic available queue.

* * * * *